United States Patent
Ricke

(10) Patent No.: US 11,788,625 B2
(45) Date of Patent: Oct. 17, 2023

(54) HYGIENIC HOLE SEAL

(71) Applicant: Hoffman Enclosures, Inc., Anoka, MN (US)

(72) Inventor: Joseph D. Ricke, Arden Hills, MN (US)

(73) Assignee: Hoffman Enclosures, Inc., Anoka, MN (US)

( * ) Notice: Subject to any disclaimer, the term of this patent is extended or adjusted under 35 U.S.C. 154(b) by 0 days.

(21) Appl. No.: 17/332,562

(22) Filed: May 27, 2021

(65) Prior Publication Data

US 2021/0372526 A1    Dec. 2, 2021

Related U.S. Application Data

(60) Provisional application No. 63/030,745, filed on May 27, 2020.

(51) Int. Cl.
 *F16J 15/3204* (2016.01)

(52) U.S. Cl.
 CPC ................. *F16J 15/3204* (2013.01)

(58) Field of Classification Search
 CPC .......... F16J 15/00; F16J 15/32; F16J 15/3204; F16J 15/3208; F16J 15/3212
 USPC ........................................................ 277/309
 See application file for complete search history.

(56) References Cited

U.S. PATENT DOCUMENTS

| | | |
|---|---|---|
| 2,255,673 A | 9/1941 | McDermott |
| 2,452,275 A | 10/1948 | Woodling |
| 2,503,169 A | 4/1950 | Phillips |
| 2,821,567 A | 1/1958 | Bergan |
| 3,180,922 A | 4/1965 | Gallant et al. |
| 3,603,912 A | 9/1971 | Kelly |
| 3,647,934 A | 3/1972 | Hurtt |
| 3,659,880 A | 5/1972 | Goldsobel |
| 3,667,783 A | 6/1972 | Sotolongo |

(Continued)

FOREIGN PATENT DOCUMENTS

| | | |
|---|---|---|
| DE | 202010005054 U1 | 8/2011 |
| DE | 202011004656 U1 | 7/2012 |

(Continued)

OTHER PUBLICATIONS

Saginaw Control & Engineering, SCE-ASPB-SS Product Specification Sheet, https://www.saginawcontrol.com/partnumber_info/?n=SCE-ASPB-SS, downloaded Oct. 4, 2022.

(Continued)

*Primary Examiner* — Nathan Cumar
(74) *Attorney, Agent, or Firm* — Quarles & Brady LLP

(57) ABSTRACT

A hole seal is provided that can include a plate having a surface configured to face away from an enclosure wall of an enclosure, and a peripheral extension that is angled away from the surface. The hole seal can include a stud coupled to and extending away from the plate, a gasket, a retaining member configured to engage an enclosure wall of an enclosure opposite the gasket, and a fastener. The fastener is configured to threadingly engage the stud and be advanced along the stud to urge the retaining member against the enclosure wall, thereby urging a peripheral extension of the plate into the gasket, via compression of the gasket against an exterior surface of the enclosure wall.

18 Claims, 5 Drawing Sheets

(56) References Cited

U.S. PATENT DOCUMENTS

| | | | |
|---|---|---|---|
| 3,899,232 A | 8/1975 | Berg et al. |
| 3,915,479 A | 10/1975 | Sotolongo |
| 3,972,547 A | 8/1976 | Itoya |
| 4,050,771 A | 9/1977 | Watson et al. |
| 4,145,075 A | 3/1979 | Holzmann |
| 4,224,464 A | 9/1980 | Bunnell et al. |
| 4,250,348 A | 2/1981 | Kitagawa |
| 4,310,273 A | 1/1982 | Kirrish |
| 4,358,079 A | 11/1982 | Navarro |
| 4,472,098 A | 9/1984 | Kiefer |
| 4,544,800 A | 10/1985 | Katsuura |
| 4,549,755 A | 10/1985 | Kot et al. |
| 4,668,037 A | 5/1987 | Jouanny |
| 4,838,342 A | 5/1989 | Guginsky |
| 4,842,548 A | 6/1989 | Bolante |
| 4,849,581 A | 7/1989 | Larkin et al. |
| 4,900,068 A | 2/1990 | Law |
| 4,983,784 A | 1/1991 | Whitlock |
| 5,051,541 A | 9/1991 | Bawa et al. |
| 5,068,494 A | 11/1991 | Bolante |
| 5,072,072 A | 12/1991 | Bawa et al. |
| 5,200,575 A | 4/1993 | Sheehan |
| 5,405,172 A | 4/1995 | Mullen, Jr. |
| 5,434,360 A | 7/1995 | Ehrenfels |
| 5,655,797 A | 8/1997 | Eldstrom, Sr. et al. |
| 5,704,400 A | 1/1998 | Eldridge |
| 5,927,892 A | 7/1999 | Teh-Tsung |
| 6,378,730 B1 | 4/2002 | Reddy |
| 6,616,194 B1 | 9/2003 | Gretz |
| 6,702,336 B1 | 3/2004 | Chelchowski et al. |
| 6,767,032 B1 | 7/2004 | Gretz |
| 7,048,561 B1 | 5/2006 | Elbaz |
| 7,390,027 B2 | 6/2008 | Kiely |
| 7,429,064 B2 | 9/2008 | Topolsek et al. |
| 7,431,343 B2 | 10/2008 | Chiu |
| 7,438,321 B2 | 10/2008 | Auray et al. |
| 7,476,353 B2 | 1/2009 | Cocchi et al. |
| 7,518,062 B2 | 4/2009 | Nepsha et al. |
| 7,604,261 B2 | 10/2009 | Kiely |
| 7,607,364 B2 | 10/2009 | Duff |
| 7,694,405 B2 | 4/2010 | Rader et al. |
| 7,914,048 B2 | 3/2011 | Shemtov |
| 7,976,070 B2 | 7/2011 | Kiely |
| 8,404,166 B2 | 3/2013 | Cocchi et al. |
| 8,490,513 B2 | 7/2013 | Chiou |
| 8,492,651 B2 | 7/2013 | Schindler |
| 8,701,520 B2 | 4/2014 | Chiou |
| 8,813,348 B2 | 8/2014 | Williams et al. |
| 8,919,221 B2 | 12/2014 | Chiou |
| 8,931,810 B2 | 1/2015 | Clason et al. |
| 8,960,728 B2 | 2/2015 | Williams et al. |
| 8,997,325 B2 | 4/2015 | Williams et al. |
| 9,062,814 B2 | 6/2015 | Kuhn |
| 9,127,785 B2 | 9/2015 | Charcenko et al. |
| 9,206,928 B2 | 12/2015 | Haynes et al. |
| 9,255,412 B2 | 2/2016 | Haynes |
| 9,297,418 B2 | 3/2016 | Williams et al. |
| 9,343,883 B2 | 5/2016 | DeCesare et al. |
| 9,371,948 B2 | 6/2016 | Coyle, Jr. |
| 9,441,769 B2 | 9/2016 | Williams et al. |
| 9,490,619 B2 | 11/2016 | Smith |
| 9,494,756 B2 * | 11/2016 | Anderson ............ G02B 6/4444 |
| 9,504,303 B2 | 11/2016 | Viscomi |
| 9,515,472 B2 | 12/2016 | Muelmichel et al. |
| 9,556,979 B2 | 1/2017 | Williams et al. |
| 9,556,981 B2 | 1/2017 | Williams et al. |
| D785,768 S | 5/2017 | Haynes et al. |
| D796,013 S | 8/2017 | Haynes |
| D796,014 S | 8/2017 | Haynes |
| D801,487 S | 10/2017 | Haynes et al. |
| 9,787,070 B2 * | 10/2017 | DeCesare ............. F16J 15/028 |
| 9,851,032 B2 | 12/2017 | Williams et al. |
| D821,553 S | 6/2018 | Haynes et al. |
| 10,000,934 B2 | 6/2018 | Haynes |
| 10,047,887 B2 | 8/2018 | Arstein et al. |
| 10,081,947 B2 | 9/2018 | Haynes |
| D840,516 S | 2/2019 | Haynes |
| 10,247,336 B2 | 4/2019 | Arstein et al. |
| 10,526,789 B2 | 1/2020 | Haynes |
| 10,587,107 B2 | 3/2020 | Morden et al. |
| 10,670,326 B2 * | 6/2020 | Kerstner ................ F25B 21/02 |
| 2002/0079113 A1 | 6/2002 | Wallis et al. |
| 2005/0035594 A1 | 2/2005 | Kiely |
| 2005/0104372 A1 | 5/2005 | Auray et al. |
| 2011/0266934 A1 | 11/2011 | Schindler |
| 2014/0206420 A1 | 7/2014 | Neichi |
| 2015/0167873 A1 | 6/2015 | Arstein et al. |
| 2015/0229111 A1 | 8/2015 | Kutalek et al. |
| 2016/0010766 A1 | 1/2016 | Haynes |
| 2016/0169425 A1 | 6/2016 | Williams et al. |
| 2016/0204587 A1 | 7/2016 | DeCesare et al. |
| 2016/0281892 A1 | 9/2016 | Arstein et al. |
| 2017/0030489 A1 | 2/2017 | DeCesare et al. |
| 2018/0023880 A1 * | 1/2018 | Kerstner ................ F25B 21/02 |
| | | | 29/890.035 |
| 2019/0093795 A1 | 3/2019 | Haynes et al. |
| 2019/0100922 A1 | 4/2019 | Haynes |

FOREIGN PATENT DOCUMENTS

| | | |
|---|---|---|
| EP | 3217028 A1 | 9/2017 |
| WO | 02/099329 A1 | 12/2002 |

OTHER PUBLICATIONS

Weigmann, Oil Tight Hole Seal ½ Inch 304 Stainless Steel Product Sheet, https://www.hubbell.com/wiegmann/en/Products/Electrical-Electronic/Enclosures/Enclosure-Accessories/Oil-Tight-Hole-Seal-12-Inch-304-Stainless-Steel/, downloaded Dec. 8, 2022.

NVent Hoffman, Hol-Sealers Hole Seal Product Sheet, https://hoffman.nvent.com/en-us/products/hol-sealers-hole-seal/pdf?measure_system=imperial, 2022.

* cited by examiner

HYGIENIC HOLE SEAL

CROSS-REFERENCE TO RELATED APPLICATIONS

This application claims priority to U.S. patent application Ser. No. 63/030,745 filed May 27, 2020, and entitled, "Hygienic Hole Seal," which is hereby incorporated by reference in its entirety.

BACKGROUND

Enclosures are used in various industries to conceal and retain different types of components, which can include, for example, electrical components. Typically, enclosures include a metal frame that supports exterior panels, which generally define the internal volume of the enclosure. The panels can include a plurality of holes used to route electrical cables, conduits, etc. In some cases, if these holes are not utilized, unwanted materials or pathogens can enter or exit the enclosure.

SUMMARY

Some embodiments of the disclosure provide a hole seal. The hole seal can include a plate having a surface configured to face away from an enclosure wall of an enclosure, and a peripheral extension that can be angled away from the surface. The hole seal can include a stud coupled to and extending away from the plate, a gasket, a retaining member configured to engage an enclosure wall of an enclosure opposite the gasket, and a fastener. The fastener is configured to threadingly engage the stud and be advanced along the stud to urge the retaining member against the enclosure wall, thereby urging a peripheral extension of the plate into the gasket, via compression of the gasket against an exterior surface of the enclosure wall.

In some embodiments, a peripheral extension of a plate can include a peripheral edge. As the fastener is advanced, the peripheral edge of the plate can be configured to contact a gasket first.

In some embodiments, a gasket can have a peripheral surface. An angle of the peripheral surface relative to a surface of a plate can be configured to be changed via compression of the gasket by a peripheral extension of the plate.

In some embodiments, a peripheral surface of a gasket can be configured to substantially align with a peripheral surface of a peripheral extension of a plate after a fastener is tightened to compress the gasket against an enclosure wall.

In some embodiments, a gasket can have a first hole, and a retaining member can have a second hole. The stud can be configured to extend through the first hole of the gasket, extend through an aperture of an enclosure wall, and extend through the second hole of the retaining member to threadingly engage with a fastener. The gasket can have opposing planar surfaces, and a surface of a plate can be planar.

In some embodiments, a peripheral extension of a plate can be configured to angle away from a stud and towards an enclosure wall when a hole seal is installed with an enclosure wall.

In some embodiments, a central region of a retaining member can be configured to be inserted into an aperture of an enclosure wall and contact a peripheral surface of the enclosure wall that defines the aperture of the enclosure wall.

In some embodiments, a gasket can be configured to extend entirely across an aperture of an enclosure wall to be sealed by the gasket, when a hole seal is installed with an enclosure.

In some embodiments, when a hole seal is installed with an enclosure, a gasket can be configured to define a sealing area between the gasket and an enclosure wall, and a non-sealing area between the gasket and the enclosure wall. The non-sealing area can be positioned radially inward relative to the sealing area.

In some embodiments, ae sealing area can be aligned with a region of a gasket in contact with a peripheral extension of a plate. The sealing area can have an annulus shape.

In some embodiments, a plate and a gasket can be configured to maintain a gap between the plate and the gasket, when a hole seal is installed with an enclosure. The gap can extend along the non-sealing area. The gap can be aligned with the non-sealing area.

Some embodiments of the disclosure provide a hole seal. The hole seal can include a plate, a stud coupled to and extending away from the plate, a gasket that surrounds the stud, a retaining member configured to engage an enclosure wall of an enclosure opposite the gasket, and a fastener configured to threadingly engage the stud. The hole seal can include at least one of the gasket having a peripheral extension that can be angled away from the stud towards the enclosure wall, in an uncompressed configuration, or the plate having a peripheral extension that can be angled away from the stud and can be configured to angle towards the enclosure wall when installed on the enclosure wall. A peripheral end of the peripheral extension of the plate can be configured to first contact the gasket and compress the gasket against an exterior surface of the enclosure wall as the fastener is tightened onto the stud.

In some embodiments, when a hole seal is installed with an enclosure, a gasket can define a sealing area between the gasket and an enclosure wall, and a non-sealing area between the gasket and the enclosure wall. The non-sealing area can be positioned radially inward relative to the sealing area.

In some embodiments, a plate can have a peripheral extension that can be angled away from a stud and towards an enclosure wall. The plate can have an exterior surface that can be configured to face away from an enclosure. The peripheral extension of the plate can be angled away from the exterior surface, and the plate can be configured to first contact the gasket at a peripheral end of the peripheral extension of the plate, when a fastener is tightened, to compress the gasket against an exterior surface of the enclosure wall.

In some embodiments, a gasket can have a first hole, a retaining member can have a second hole, and the retaining member can have a central region and a peripheral end that is rearwardly offset from the central region in a direction that extends away from the enclosure wall when the retaining member is installed. A stud can be configured to extend through the first hole of the gasket, extend through an aperture of the enclosure wall to be sealed by the gasket, and extend through the second hole of the retaining member prior to be threadingly engaged with the fastener. The central region of the retaining member can be configured to be forced into the aperture of the enclosure wall, when the fastener is tightened, so that the peripheral flange contacts an interior surface of the enclosure wall.

In some embodiments, a peripheral surface of the gasket can be configured to substantially align with a peripheral surface of a peripheral extension of the plate, after a fastener is tightened to compress the gasket.

Some embodiments of the disclosure provide a method for sealing an aperture of an enclosure with a hole seal. The method can include engaging a threaded fastener with a stud of the hole seal, and rotating the threaded fastener until the threaded fastener urges a retaining member of the hole seal into contact with an interior surface of the enclosure. Urging the retaining member into contact with the interior surface of the enclosure can cause a peripheral extension of a plate of the hole seal to contact a gasket of the hole seal to compress the gasket against an exterior surface of the enclosure wall. The peripheral extension of the plate can be angled towards the enclosure wall relative to an exterior surface of the plate.

In some embodiments, contact between a peripheral extension of a plate and a gasket can change an angle of a peripheral surface of the gasket relative to an exterior surface of an enclosure, as the fastener is rotated, and can generate a sealing area between the gasket and an enclosure wall. The sealing area can include a portion of the gasket in contact with the peripheral extension of the plate. Contact between the peripheral extension of the plate and the gasket can generate a non-sealing area between the gasket and the enclosure wall that is radially inward from the sealing area.

In some embodiments, changing an angle of a peripheral surface of a gasket substantially aligns the angle of the peripheral surface of the gasket with an angle of an exterior surface of a peripheral extension of a plate.

In some embodiments, a retaining member can include a central region and a peripheral flange that can be rearwardly offset from the central region. The method can include inserting the central region into an aperture of an enclosure wall, and contacting the peripheral flange of the retaining member with an interior surface of the enclosure wall.

Some embodiments of the disclosure provide an enclosure. The enclosure can include an enclosure wall having an exterior surface, an interior surface, and an aperture. The enclosure can include a hygienic hole seal. The hygienic hole seal can include a first plate, a retaining plate having a hole, and a stud coupled to the first plate. The stud can be threaded and can be configured to be received through the hole of the retaining plate. The hygienic hole seal can include a gasket coupled to the first plate. The gasket can have a peripheral edge angled away from the stud. The hygienic hole seal can include a threaded fastener that can be configured to threadingly engage the stud when the retaining plate is situated between the threaded fastener and the interior surface of the enclosure wall. The hygienic hole seal can interface with the enclosure wall at the aperture to provide a seal, upon the threaded fastener being rotated to urge the retaining plate towards the interior surface of the enclosure wall to thereby urge the peripheral edge of the gasket against the exterior surface of the enclosure wall.

In some embodiments, a peripheral edge deflects farther away from a stud when a gasket is forced against an exterior surface of an enclosure.

In some embodiments, a first plate has a first surface and a second surface opposite the first surface. A gasket can be overmolded around the first plate, such that the gasket interfaces with the first surface and the second surface of the first plate.

In some embodiments, a first plate can be circular. The gasket can be circular, and the retaining plate can be circular.

In some embodiments, a first plate has a first surface, a second surface opposite the first surface, and an outside edge between the first and second surfaces. A gasket can have a recess and a cutout. A stud can be received through the cutout. The second surface and the outside edge of the first plate can be received within the recess to secure the gasket around the first plate.

In some embodiments, a first surface can be relatively smooth.

In some embodiments, an aperture can be a first aperture having a first diameter. A hygienic hole seal can be configured to provide a seal for a second aperture having a second diameter. A first diameter can be different than the second diameter.

In some embodiments, a gasket has a first surface and an opposite second surface. The first surface of the gasket can be coupled to the first plate. A plurality of saw tooth cutouts can be directed into the second surface of the gasket.

In some embodiments, a gasket can comprise silicone. A first plate can comprise stainless steel.

In some embodiments, a peripheral edge can be angled away from a stud at an angle. The angle can be in a range from about 10 degrees to about 60 degrees.

Some embodiments of the disclosure provide a hygienic hole seal for an enclosure wall with an interior surface, an exterior surface, and an aperture that extends between the interior and exterior surfaces. The hygienic hole seal can include, a first plate, a retaining member, a stud configured to extend through the retaining member, and a gasket coupled to the first plate. The gasket can have a peripheral edge extending away from the stud. The hygienic hole seal can include a fastener that can be configured to engage the stud when the retaining member is situated between the fastener and the interior surface of the enclosure wall to urge the retaining member towards the interior surface of the enclosure wall, thereby urging the peripheral edge of the gasket into sealing engagement with the exterior surface of the enclosure wall around the aperture.

In some embodiments, a gasket extends fully across an aperture when a peripheral edge of a gasket is urged into sealing engagement with an enclosure wall.

In some embodiments, a peripheral edge of a gasket can be configured to angle towards an enclosure wall, relative to a first plate, when the first plate is positioned to be installed for sealing engagement with the enclosure wall.

In some embodiments, a gasket can comprise silicone. A first plate can comprise stainless steel.

In some embodiments, a gasket can have a first surface and an opposite second surface. The first surface of the gasket can be coupled to the first plate. A plurality of saw tooth cutouts can be directed into the second surface of the gasket.

In some embodiments, a first surface is relatively smooth.

In some embodiments, an aperture can be a first aperture having a first diameter. A hygienic hole seal can be configured to provide a seal for a second aperture having a second diameter. The first diameter can be different than the second diameter. The first diameter and the second diameter can be within a range from about 0.75 inches to about 5.125 inches.

In some embodiments, a peripheral edge can be angled away from a stud at an angle. The angle can be in a range from about 10 degrees to about 60 degrees.

Some embodiments of the disclosure provide a method for sealing an aperture for an enclosure with a hygienic hole seal. The enclosure can have an exterior surface and an opposite interior surface. The method can include inserting a stud of the hygienic hole seal through the aperture of the enclosure. The stud can have threads and can be coupled to a first plate. The first plate can be coupled to a gasket. The method can include inserting a stud through a hole of a retaining plate of the hygienic hole seal, engaging a threaded fastener with the stud, and rotating the threaded fastener to clamp the retaining plate to the interior surface of the enclosure and the gasket to the exterior surface of the enclosure. The method can include deflecting a peripheral edge of the gasket to provide a seal between the hygienic hole seal and the aperture of the enclosure when the threaded fastener is rotated.

In some embodiments, a gasket can have a first surface and an opposite second surface. The first surface of the gasket can be coupled to the first plate. A plurality of saw tooth cutouts can be directed into the second surface of the gasket. The plurality of saw tooth cutouts can allow for a second surface of the gasket that includes the saw tooth cutouts to expand when a threaded fastener is rotated.

Some embodiments of the disclosure provide a hygienic hole seal for an enclosure wall with an interior surface, an exterior surface, and an aperture that extends between the interior and exterior surfaces. The hygienic hole seal can include a first plate with an angled peripheral edge, a retaining member, a stud configured to extend through the retaining member, a gasket, and a fastener that is configured to engage the stud when the retaining member is situated between the fastener and the interior surface of the enclosure wall to urge the retaining member towards the interior surface of the enclosure wall, thereby urging the angled peripheral edge of the first plate to deform the gasket while compressing the gasket into sealing engagement with the exterior surface of the enclosure wall around the aperture.

In some embodiments, a first plate can be configured to deform an outer peripheral surface of the gasket to provide an angled profile for the gasket between the first plate and an exterior surface of the enclosure.

In some embodiments, an angled peripheral edge of a first plate can include a non-rounded peripheral end that can be configured to locally deform the gasket when the angled peripheral edge contacts the gasket.

Some embodiments of the disclosure provide a hole seal. The hole seal can include a first plate having a peripheral edge that can be angled. The peripheral edge can define a peripheral end. A stud can be coupled to and extend away from the first plate. The peripheral edge can be angled relative to the stud so that the peripheral end is positioned away from the stud. The hole seal can include a gasket that can be planar and can have a first hole. The hole seal can include a retaining plate having a second hole, and a fastener configured to threadingly engage the stud. With an enclosure wall situated between the gasket and the regaining plate, and the fastener threadingly engaged with the stud, tightening of the fastener urges the peripheral end of the first plate into contact with the gasket forcing the gasket against an exterior surface of the enclosure wall.

Some embodiments of the disclosure provide an enclosure. The enclosure can include an enclosure wall having an exterior surface, an interior surface, an aperture, and a hygienic hole seal. The hygienic hole seal can include a first plate, a retaining plate having a hole, and a stud coupled to the first plate. The stud can be threaded and configured to be received through the hole of the retaining plate. A gasket can be coupled to the first plate. The gasket can have a peripheral edge angled away from the stud. A threaded fastener can be configured to threadingly engage the stud when the retaining plate is situated between the threaded fastener and the interior surface of the enclosure wall. The hygienic hole seal can interface with the aperture to generate a seal upon the threaded fastener being rotated to urge the retaining plate towards the interior surface of the enclosure wall to thereby urge the peripheral edge of the gasket against the exterior surface of the enclosure wall.

Some embodiments of the disclosure can provide a hygienic hole seal for an enclosure. The enclosure can include an enclosure wall having an interior surface, an exterior surface, and an aperture that extends between the interior and exterior surfaces. The hygienic hole seal can include a first plate, a retaining member, a stud configured to extend through the retaining plate, and a gasket coupled to the first plate. The gasket can have a peripheral edge extending away from the stud. A fastener can be configured to engage the stud when the retaining plate is situated between the fastener and the interior surface of the enclosure wall to urge the retaining plate towards the interior surface of the enclosure wall, thereby urging the peripheral edge of the gasket into sealing engagement with the exterior surface of the enclosure wall around the aperture.

Some embodiments of the disclosure can provide a method for sealing an aperture for an enclosure with a hygienic hole seal. The enclosure can have an exterior surface and an opposite interior surface. The method can include inserting a stud of the hygienic hole seal through the aperture of the enclosure, the stud having threads and being coupled to a first plate, the first plate being coupled to a gasket. Inserting the stud through a hole of a retaining plate of the hygienic hole seal. Engaging a threaded fastener with the stud. Rotating the threaded fastener to clamp the retaining plate to the interior surface of the enclosure and the gasket to the exterior surface of the enclosure. Deflecting a peripheral edge of the gasket to generate a seal between the hygienic hole seal and the aperture of the enclosure when the threaded fastener is rotated.

Some embodiments of the disclosure can provide a hygienic hole seal for an enclosure wall with an interior surface, an exterior surface, and an aperture that extends between the interior and exterior surfaces. The hygienic hole seal can include a first plate with an angled peripheral edge, a retaining member, a stud configured to extend through the retaining member, a gasket, and a fastener. The fastener can be configured to engage the stud when the retaining member is situated between the fastener and the interior surface of the enclosure wall to urge the retaining member towards the interior surface of the enclosure wall, thereby urging the angled peripheral edge of the first plate to deform the gasket while compressing the gasket into sealing engagement with the exterior surface of the enclosure wall around the aperture.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
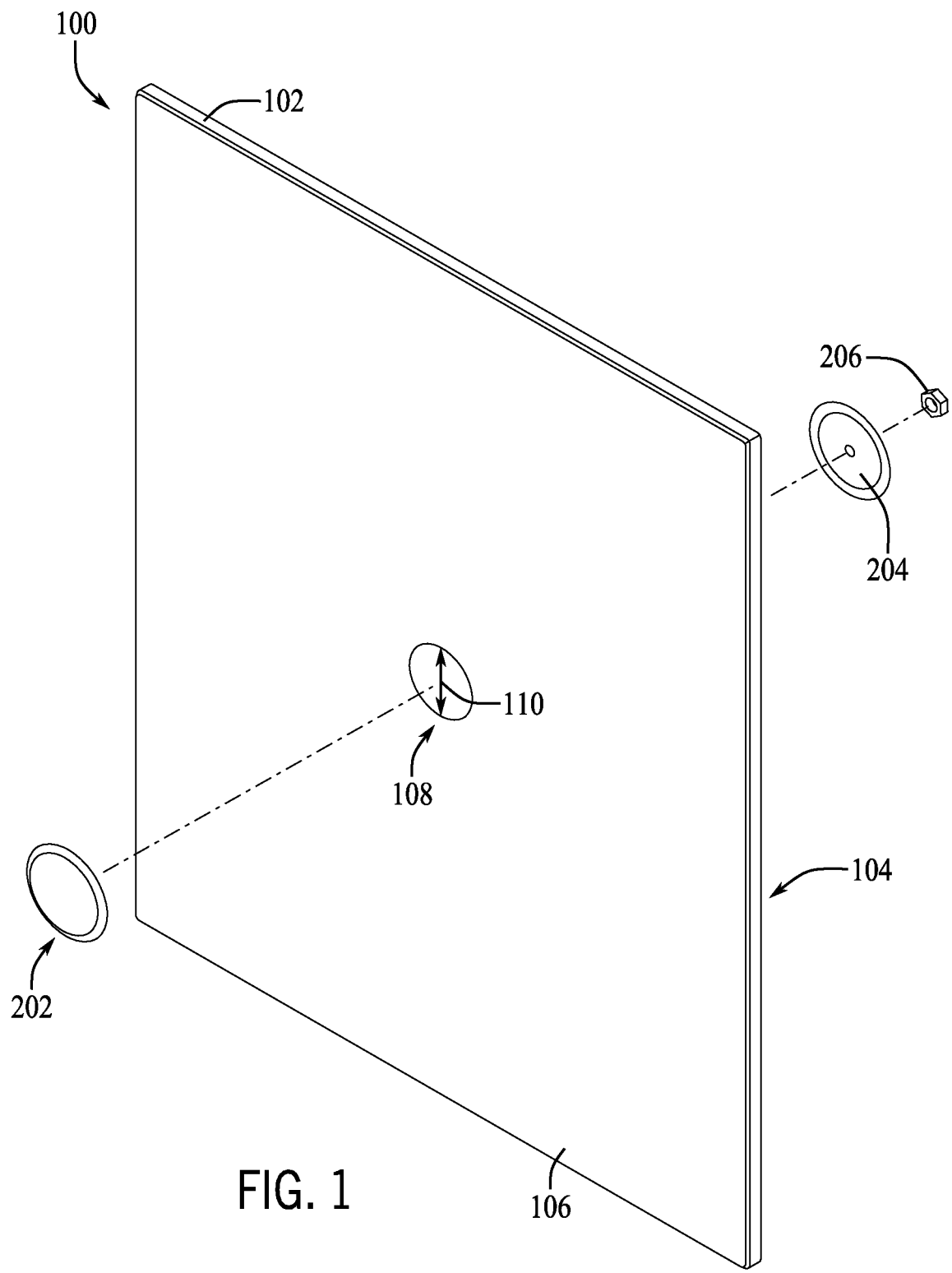
FIG. 1 is a front isometric view of an enclosure and a hygienic hole seal, according to one embodiment of the present disclosure.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "front," or "back" features is generally intended as a description only of the orientation of such features relative to a reference frame of a particular example or illustration. Correspondingly, for example, a "top" feature may sometimes be disposed below a "bottom" feature (and so on), in some arrangements or embodiments. Further, references to particular rotational or other movements (e.g., counterclockwise rotation) is generally intended as a description only of movement relative a reference frame of a particular example of illustration.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Enclosures can typically include metal paneling supported by a frame, defining the walls of the enclosure. In some cases, the enclosure walls include pre-punched (or otherwise formed) holes of various sizes that allow the customer to expand the size of an enclosure. For example, two enclosures can be adjoined together, such that the pre-punched holes from a first enclosure align with the pre-punched holes from the second enclosure. Subsequently, a connector at a given pre-punched hole can allow for the routing of electrical cables, conduits, etc., from one enclosure to another enclosure. In some configurations, pre-punched (or other) holes can also be provided for other purposes, including for optional use to run cables into or out of an enclosure In some configurations, enclosures can have holes that are not utilized (e.g., are not used to run cables between adjoining enclosures). For example, enclosure panels at outside ends of ganged enclosures do not have adjoining enclosures. Thus, the pre-punched holes in these panels may be exposed to the environment and not used to route cable (or for other purposes). If these holes, or other exposed and unplugged holes in enclosures are not utilized, dust, water, or other contaminants can enter into the internal volume of the enclosure, which can negatively impact the electrical components secured within (e.g., short-circuiting, etc.).

Some conventional solutions to the problem of exposed and unplugged holes include hole seals or plugs that are sized interface with a given pre-punched hole to create a seal. However, these conventional approaches may not be suitable for industries in which there are high regulatory cleanliness standards (e.g., hygienic industries, such as for food or pharmaceutical production). For example, although typical hole seals may prevent dust from penetrating within the internal volume of the enclosure, the seal generated does not entirely prevent moisture, or pathogens from entering into the enclosure or may otherwise harbor contaminants so as to require rigorous and time-consuming cleaning (e.g., as may substantially decrease throughput for the manufacturing plant).

As another example, although a variety of seals are available for non-hygienic applications, many materials for these seals do not deter the seeding and production of pathogens, but rather may harbor and allow the production of pathogens to flourish. For example, typical non-hygienic gaskets and seals are formed of materials in which moisture and pockets allow for the adhering and reproduction of pathogens. More specifically, rough surfaces, for example, have divots or pockets that allow pathogens to better adhere to the surface. Additionally, typical gaskets and seals are formed of materials that cannot be subjected to the necessary cleaning chemicals to rid the enclosure of pathogens. For example, cleaning chemicals can eat away or corrode the materials of conventionally formed gaskets and seals.

As a still further example, conventionally formed hole seals or plugs are generally sized for only a particular diameter hole. In other words, a specific hole seal of a particular size only can seal a pre-punched hole of a corresponding size. Thus, conventionally formed hole seals are not typically universal, such that one sized hole seal can effectively seal holes of a range of diameters.

Embodiments of the invention can provide improvements over the conventional systems described above. For example, some systems and methods according to embodiments of the invention can provide a seal of a given size that can effectively seal pre-punched holes of various diameters. As another example, embodiments of the disclosed hole seal can be readily formed of hygienic materials, which can be subjected to routinely used cleaning chemicals without excessive degradation.

FIG. 1 illustrates a front perspective view of an enclosure 100 and a hygienic hole seal 200, according to one embodiment of the invention. The enclosure 100 can be typically structured and formed (e.g., out of steel, aluminum, etc.), but is shown simplistically for clarity, with many components including the enclosure body, the enclosure center post, and the enclosure frame not being shown. The enclosure 100 includes an enclosure wall 102 having an interior surface 104 and an exterior surface 106. An aperture 108 is shown as being circular and extending between the surfaces 104, 106. In alternative embodiments, however, an aperture can be formed differently, for example, being increased in size, changed in shape (e.g., square), etc. relative to the aperture 108. Likewise, other aspects of an enclosure, including location of an aperture, thickness or other geometry of a relevant wall, etc. can vary as compared to the enclosure 100.

As shown in FIG. 1, the hygienic hole seal 200 is in an uninstalled and exploded view configuration, to illustrate certain mechanical interfacing and spatial relationship between components. In particular, in the illustrated orientation, the hygienic hole seal 200 has a sealing member 202 situated near the exterior surface 106, a retaining member 204 situated near the interior surface 104, and a fastener 206 situated near the interior surface 104 and configured to couple the sealing member 202 to the retaining member 204. As further detailed below, the components of the seal 200 can be similarly arranged prior to installation at the aperture 108.

Figure 2:
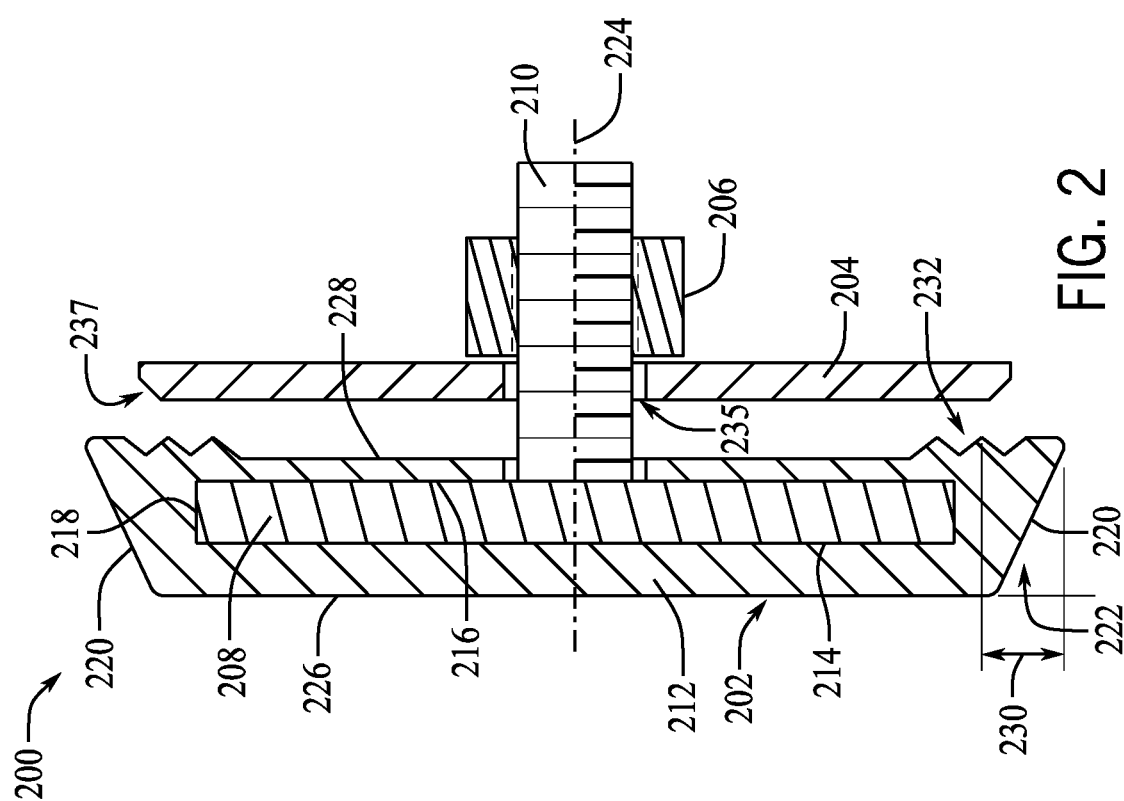
FIG. 2 is a cross-sectional view of the hygienic hole seal of FIG. 1.

As shown in FIG. 2, which is a cross-sectional view of the hygienic hole seal 200 in an installed configuration, but not in engagement with the enclosure wall 102 at the aperture 108. The sealing member 202 includes a plate 208 and a stud 210 coupled to the plate 208. While the plate 208 is illustrated in FIG. 2 as being planar, the plate 208 can be implemented to have other configurations (e.g., a curved plate). Although FIG. 2 shows the stud 210 as being integrally formed with the plate 208 (e.g., via welding), in other configurations a stud can mechanically interface with a plate using components and methods typically used in the art (e.g., adhesives, magnetic components, threadingly engaged with the base, etc.). The stud 210 is threaded, such that the stud 210 can threadingly engage the fastener 206. In some embodiments, the threads of the stud 210 can span the entire axial length of the stud 210, while in other embodiments, the threads may only span a portion of the axial length of the stud 210, where the remaining portions are relatively smooth. In some embodiments, other configurations (e.g., non-threaded configurations) are also possible.

As also shown in particular in FIG. 2, the sealing member 202 also includes a gasket 212 that is overmolded around the plate 208. Thus, the gasket 212 interfaces with a first surface 214, an opposite second surface 216, and an outside edge 218 (e.g., between the surfaces 214, 216) of the plate 208. In some cases, the perimeter shape of a gasket, a plate, and an aperture can be geometrically similarly. For example, including as illustrated in FIG. 2, the gasket 212, the plate 208, and the aperture 108 (see FIG. 1) are circular, albeit with different diameters. However, in other embodiments a gasket can be a particular shape (e.g., circular) that is different from a particular shape of an associated plate or aperture (e.g., square).

In some embodiments, a peripheral edge of a gasket can exhibit an angled (e.g., obliquely angled) geometry. For example, the gasket 212 has a peripheral extension 220 that extends away from the stud 210 at a particular angle 222. For example, the surface 226 of the gasket 212 (or the plate 208) can be planar and a reference plane can be aligned with the surface 226 (or the surface 214) and extend beyond the perimeter of the surface 226. As shown in FIG. 2, the angle 222 can be an acute angle defined between the reference plane (as defined by the surface 226) and a peripheral surface of the peripheral extension 220. As a more specific example, the angle 222 is shown as being a positive acute angle with the angle 222 extending away from the surface 226 and towards the enclosure wall 102 (see FIG. 3) and the retaining member 204 (i.e., to the right of the surface 226 with respect to the view in FIG. 2), rather than extending away from the surface 226 and away from the enclosure wall 102 and the retaining member 204 (i.e., towards the left of the surface 226 with respect to the view in FIG. 2), which would be a negative angle.

In some cases, a different reference frame can define the angle 222. For example, the stud 210 defines an axis 224 and a relevant angle (e.g., corresponding to the angle 222) can be alternatively defined between the peripheral extension 220 and a reference line parallel to the axis 224. In this case, for example, such an angle would be complementary to the angle 222 and would extend away from the stud 210 and the axis 224 and towards the enclosure wall 102 when installed. In some configurations, the angle 222 is in a range from about (i.e., deviating by less than 10 percent) 30 degrees to about 80 degrees. In some embodiments, an angle that is complementary to the angle 222 can be about 10 degrees to about 60 degrees.

In some cases, the peripheral extension 220 can extend entirely (or partially) around the axis 224. For example, in the partial configuration, the peripheral extension 220 can have sections (e.g., arc lengths) that do not include the peripheral extension 220. In the entire configuration, the peripheral extension 220 can extend around the entire axis 224. In this way, as described below, the peripheral extension 220 deflects against the enclosure wall 102 around the entire axis 224 to generate a seal between the peripheral extension 220 and the enclosure wall 102 around the entire axis 224. While FIG. 2 shows the peripheral extension 220 as being uniform (e.g., the angle 222 is uniform) throughout the entire circumference of the gasket 212, other configurations are possible (e.g., the angle 222 of the peripheral end varying around the axis 224). In some embodiments, the inclusion of a peripheral angle on a gasket (e.g., the angle 222) can help to prevent high pressure jets, such as from cleaning sprays, from lifting the edge of a gasket off of an enclosure wall.

As shown in FIG. 2, the gasket 212 has exterior surface 226 and an interfacing surface 228. The exterior surface 226 is situated away from the exterior surface of an enclosure (e.g., the exterior surface 106), whereas the interfacing surface 228 is configured to engage with the exterior surface of the enclosure. Both surfaces 226, 228 are circular and thus each defines a diameter. However, it can be appreciated that in other embodiments one or both of the surfaces 226, 228 can be shaped differently (e.g., squarely), based on the particular application. The difference in diameters between the surfaces 226, 228 defines the difference in diameter 230, which relates to the angle 222 of the peripheral extension 220.

In some embodiments, an interfacing surface can exhibit complex geometry in order to provide improved sealing with an enclosure wall. For example, the interfacing surface 226 has a sawtooth region 232 situated at a radial end of the gasket 212. The sawtooth region 232 can partially (or entirely) extend around the axis 224. In some cases, and as illustrated in FIG. 2, the sawtooth region 232 is positioned at the same location of the gasket 212 as the peripheral extension 220 (e.g., the sawtooth region 232 is positioned underneath the peripheral extension 220). In this case, for example, the sawtooth region 232 can be positioned at the same location on the gasket 212 as each section of the peripheral extension 220. As shown in FIG. 2, the sawtooth region 232 has triangular cutouts (e.g. saw tooth cutouts)

that are directed into the interfacing surface 228, which defines a saw tooth pattern when viewed in cross-section, such as in FIG. 2. The cutouts can be uniform in size, can increase in size in an increasing radial direction, can decrease in size in an increasing radial direction, or exhibit other variations (e.g., may be non-triangular) relative to the example illustrated in FIG. 2.

The regions of the interfacing surface 228 that are separate (e.g., radially inward) from the sawtooth region 232 are relatively smooth (e.g., relative to a smoothness standard required for hygienic applications). Similarly, the exterior surface 226 is also relatively smooth, for example, being within a tolerance of smoothness required for hygienic applications. In some cases, the interfacing surface 228 can be planar, the exterior surface 226 can be planar, and the interfacing surface 228 can be coplanar to the exterior surface 226.

Although not illustrated in FIG. 2, the gasket 212 can be formed to be visually distinct from the surrounding enclosure, which can allow for the easy identification of the hygienic hole seal 200 (e.g., for removal purposes). For example, the gasket 212 can be formed of a material that gives the gasket 212 a visually blue appearance, which may be strikingly different than its surrounding environment. In some cases, the gasket 212 can formed out of a hygienic material (e.g., food and beverage grade silicone, medical grade silicone, etc.), some examples of which are naturally visually blue.

In the embodiment illustrated in FIG. 2, the retaining member 204 is disposed between the fastener 206 and the sealing member 202. In order to achieve this positional relationship between these components, the retaining member 204 can have a hole 235 sized, such that the stud 210 extends through the hole 235 once a clearance between the retaining member 204 and the plate 208 is small enough. The hole 235 is shown and described as being circular. However, in some embodiments a hole can be shaped differently (e.g., squarely, triangularly, etc.). Similarly, the retaining member 204 is shown as being circular and plate-like, however, in some embodiments a retaining member 204 can be otherwise (e.g., squarely) shaped, or can include any mechanical component typically used in the art that is configured to engage with the interior surface of the enclosure (e.g., the interior surface 104). As another example, while the retaining member 204 can be planar, in other configurations, the retaining member 204 can have other three-dimensional shapes (e.g., a curved plate).

In some embodiments, a retaining member can include beveled, chamfered, or rounded edges. For example, the retaining member 204 can include a chamfered edge 237 that can extend around entirely (or partially) around the perimeter of the retaining member 204, which faces towards the interior surface of the enclosure wall. Thus, for example, if the diameter of the retaining member 204 is sized similarly to the diameter 110 of the aperture 108, then the chamfered edge 237 can wedge into the edges that define the aperture 108. In some cases, however, a retaining member can simply sit flushly against an interior side of an enclosure, such as may allow the retaining member to provide a structural support at apertures of any variety of different sizes. Similarly, in some configurations, the retaining member 204 has a diameter that is larger than the exterior surface 226 of the gasket 212. This dimensional relationship can allow for the effective distribution of forces necessary to generate a seal with the gasket 212, which will be discussed in more detail below.

In some embodiments, a threaded fastener can be provided, in order to allow threaded tightening of a gasket into sealing engagement with an enclosure wall. For example, the fastener 206 is threaded to threadingly engage the stud 210. Accordingly, as the fastener 206 is rotated, the fastener 206 traverses the stud 210 to urge the retaining member 204 closer to the sealing member 202 and a tight seal can be obtained (as also described below). However, although the retaining member 204 is urged closer to the sealing member 202 by usage of a threaded fastener (e.g., the fastener 206), it can be appreciated that in alternative embodiments, alternative fastening components typically used in the art can be added or substituted.

In some embodiments, the gasket 212, the sealing member 204 (e.g., when the sealing member 204 is implemented as a plate), and the plate 208 can have similar or different shapes. For example, the sealing member 204, 208, and the gasket 212 can each have the same shape. In this case, because the shapes between the components are the same, the hygienic hole seal 200 can be configured to provide a better seal with the enclosure wall 102 (e.g., due to the better distribution of forces). As a specific example, the remaining member 204, the plate 208, and the gasket 212 can each have a curved perimeter (e.g., having an oval shape, a square shape having rounded edges, a rectangular shape having rounded edges, other polygons with curved edges, etc.). In this case, the seal generated between the hygienic hole seal 200 and the enclosure wall 102 can be better (e.g., because of the avoidance of abrupt changes in the peripheral shape of the components—especially the gasket 212—that may introduce disengagement between the gasket 212 and the enclosure wall 102). In addition, including when the peripheral extension 220 extends around the entire axis 224, and when the gasket 212 has curved edges each joining two adjacent straight regions of the perimeter, the peripheral extension 220 can deflect against the enclosure wall 102 in a continuous manner around the entire axis 224 so that gaps between the peripheral extension 220 and the enclosure wall 102 due to discontinuously shaped gaskets are avoided (e.g., gaskets having perimeters with edges, vertices, etc.). Thus, in some cases, the peripheral shape of the gasket 212 can be free of vertices (e.g., free of polygonal profile vertices).

Figure 3:
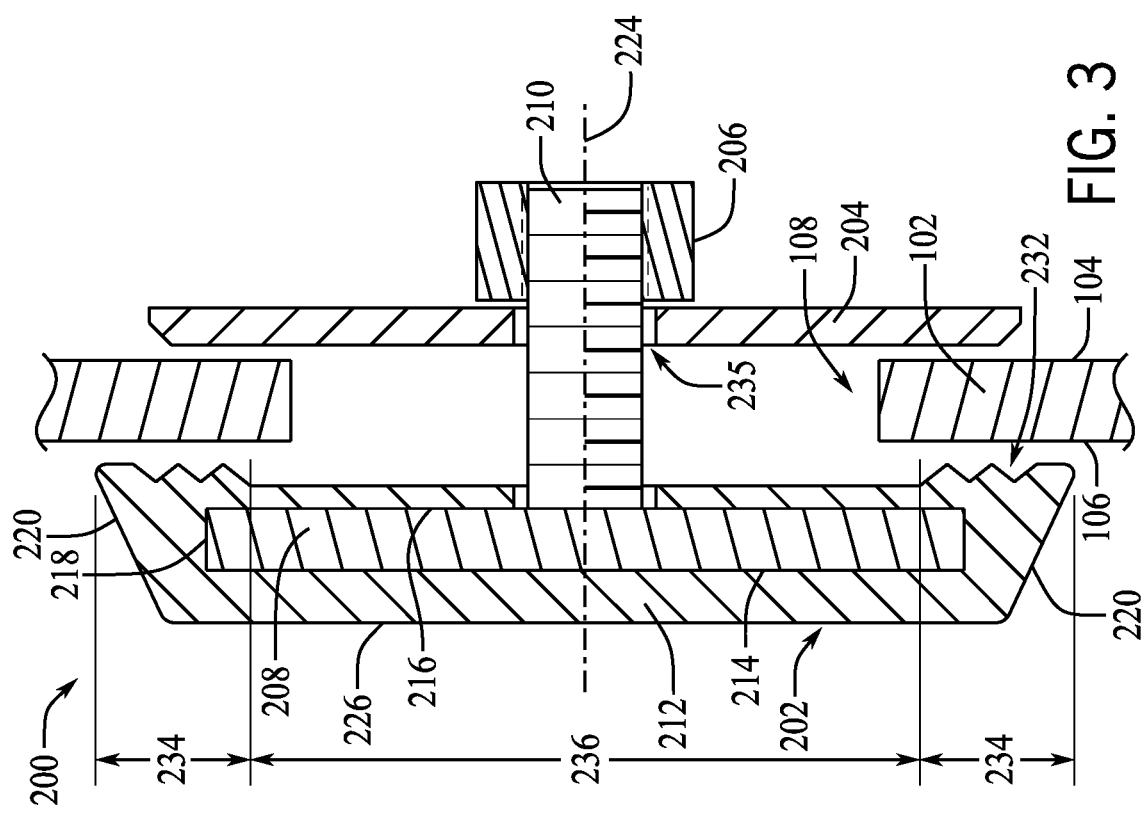
FIG. 3 is a cross-sectional view of the hygienic hole seal of FIG. 1 installed at an aperture of the enclosure of FIG. 1.

FIG. 3 shows the hygienic hole seal 200 in an installed configuration, engaged with the enclosure 100 at the aperture 108. The hygienic hole seal 200 can be installed in numerous ways. However, an example installation process begins with the hygienic hole seal 200 in the configuration shown in FIG. 2. The fastener 206 is rotated and removed from engagement with the stud 210 of the sealing member 202. Then, the retaining member 204 is also removed from the stud 210. Once the fastener 206 and the retaining member 204 have been removed, the sealing member 202 is placed in the desired position. More specifically, the gasket 212 is situated against the exterior surface 106 of the enclosure wall 102, and correspondingly the stud 210 is inserted through the aperture 108 (e.g., as achieved by moving the sealing member 202, as illustrated in FIG. 1, towards the enclosure wall 102). Then, with the stud 210 through the aperture 108, the stud 210 is inserted into the hole 235 of the retaining member 204 (e.g., as achieved by moving the retaining member 204, as illustrated in FIG. 1, towards the enclosure wall 102 and the sealing member 202).

Subsequently, the fastener 206 can be threadingly engaged with the stud 210 and then rotated to urge the retaining member 204 against the interior surface 104 of the enclosure wall 102. As the retaining member 204 is urged against the interior surface 104 by tightening the fastener 206, the gasket 212 is correspondingly urged against the exterior surface 106, and the peripheral extension 220 of the gasket 212 deflects away from the stud 210 to generate an appropriate seal. In some cases, the sawtooth region 232 allows the peripheral extension 220 to either deflect more easily, or to a greater extent than the edge 220 might otherwise (e.g., to deflect at a greater angle than the angle 222), or can otherwise help to ensure that an appropriate seal is obtained.

In some embodiments, and as illustrated in FIG. 3, the gasket 212 extends fully across the aperture 108 when the gasket 212 is in sealing engagement with the exterior surface 106 of the enclosure wall 102 (e.g., and the gasket 212 is positioned outside of the aperture 108 of the enclosure wall 102). This sealing engagement thus allows for the hygienic hole seal 200 to be used to generate a seal for various sized (and shaped) apertures in enclosure walls. For example, as long as the gasket 212 is wide enough to extend sufficiently radially past the outer diameter of an aperture, the seal 200 may be able to seal the aperture regardless of aperture diameter (e.g., and aperture shape). Thus, relative to FIG. 3, for example, the gasket 212 can be used to seal an aperture that is substantially (i.e., deviating by more than 15 percent) smaller than the aperture 108, as well as an aperture that is somewhat larger than the aperture 108. In this regard, for example, a gasket (e.g., the gasket 212), a plate (e.g., the plate 208), and a retaining member (e.g., the retaining member 204), or any combinations of these components, can be dimensioned such that an appropriate seal can be generated for any variety aperture sizes (e.g., within a range from about 0.75 inches to about 5.125 inches).

In some embodiments, such as in the installed configuration of the hygienic hole seal 200, contact between the gasket 212 and the enclosure wall 102 (e.g., the exterior surface 106) can define a sealing area 234, and a non-sealing area 236 that is positioned radially inward relative to the sealing area 234. Generally, a non-sealing area can be considered to be an area of a gasket that is not in contact with a relevant surface or that is in contact with a relevant surface but is not sufficiently compressed against the surface to provide a desired seal (e.g., as specified in an industry-standard Ingress Protection (IP) rating). In some cases, the sealing area 234 can be the only portion of the gasket 212 that is compressed. For example, the sealing area 234 can include only the contact between the peripheral extension 220 of the gasket 212 and the enclosure wall 102. In some cases, the sealing area 234 can include a portion (or the entire) saw tooth region 232. The remaining portion of the surface of the gasket 212 that faces the enclosure wall 102 that is not the sealing area 234 can define the non-sealing area 236. In some embodiments, advantageously the sealing area 234 can be smaller than the non-sealing area 236. In this way, more of the clamping force from the fastener 206 is directed to creating a tighter seal at the sealing area 234 rather than a looser seal that includes all regions of the gasket 212. In some cases, the non-sealing area 236 can include portions of the gasket 212 that have not been compressed. In some embodiments, the sealing area 234 can form a continuous perimeter around the aperture 108 of the enclosure wall 102. The shape of this continuous perimeter can depend on the shape of the gasket 212 or on the shape of a relevant portion of a plate that compresses the gasket 212 (e.g., the plate 208). For example, such as when the gasket 212 is implemented as a circle, the sealing area 234 can have an annulus shape and the perimeter can have a circular shape.

Figure 4:
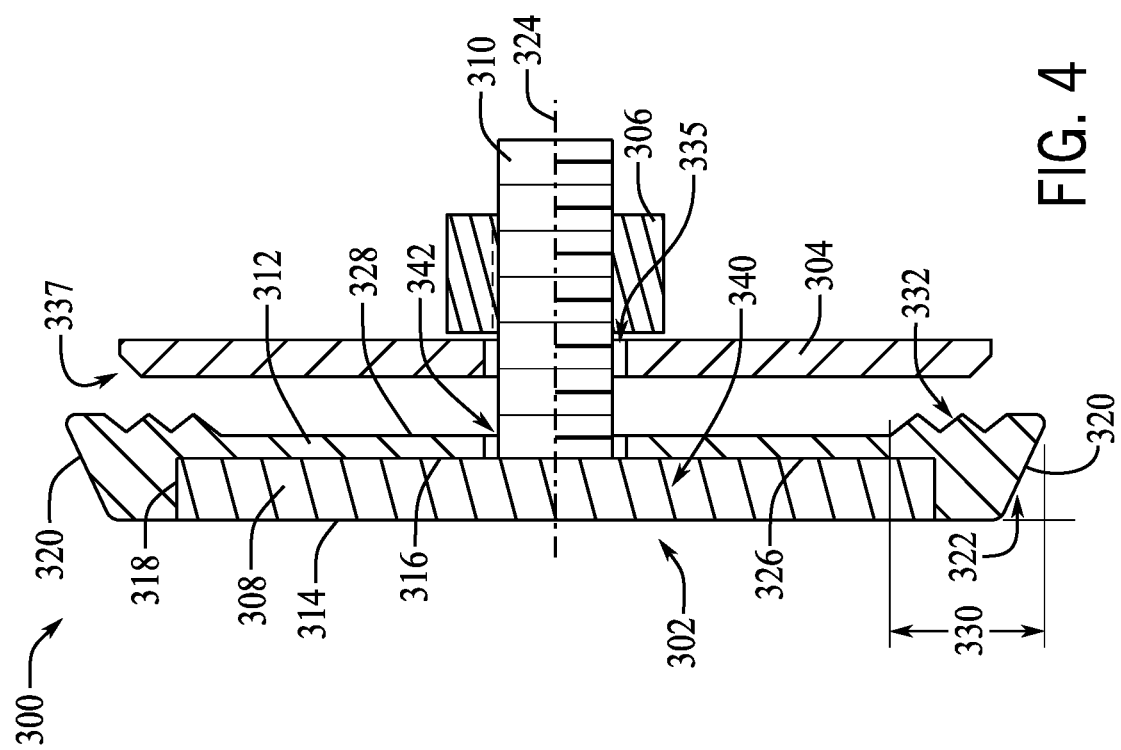
FIG. 4 is a cross-sectional view of another hygienic hole seal, according to a second embodiment of the present disclosure.

In other embodiments, other configurations are possible. For example, FIG. 4 shows a cross-sectional view of a hygienic hole seal 300 in an installed configuration, but not in engagement with an aperture, according to another embodiment of the disclosure. The hygienic hole seal 300 includes components similar to those previously described relative to the hygienic hole seal 200. Thus, although some differences will be apparent from the FIGS. and the discussion below, the discussion of the hygienic hole seal 200 above also generally pertains to the hygienic hole seal 300. For example, the hygienic hole seal 300 includes a plate 308 and a stud 310 coupled to the plate 308. The plate 308 includes a first surface 314, an opposite second surface 316, and an outside edge 318 (e.g., between the surfaces 314, 316) of the plate 308. While the plate 308 is illustrated in FIG. 4 as being planar, the plate 308 can be implemented to have different three-dimensional configurations (e.g., a curved plate).

Although FIG. 4 shows the stud 310 as being integrally formed with the plate 308 (e.g., via welding), in other configurations the stud 310 can mechanically interface with the plate 308 using components and methods typically used in the art (e.g., adhesives, magnetic components, etc.). The stud 310 is threaded, such that the stud 310 can threadingly engage the fastener 306. In some embodiments, the threads of the stud 310 can span the entire axial length of the stud 310, while in other embodiments, the threads may only span a portion of the axial length of the stud 310, whereas the remaining portions may be relatively smooth.

The sealing member 302 also includes a gasket 312 that is coupled to the plate 308. In some embodiments, the retaining member 304 (e.g., implemented as a plate), the plate 308, and the gasket 312 can each have the same shape (or different shapes). For example, each of the retaining member 304, the plate 308, and the gasket 312 can have a curved perimeter (e.g., having a circular shape, an oval shape, a square shape having rounded edges, a rectangular shape having rounded edges, other polygons with curved edges, etc.).

As shown in FIG. 4, the gasket 312 has a peripheral extension 320 that extends away from the stud 310 at a particular angle 322. For example, the surface 314 of the plate 308 can be planar and a reference plane can be aligned with the surface 314 and extend beyond the perimeter of the surface 314. As shown in FIG. 4, the angle 322 can be an acute angle defined between the reference plane (as defined by the surface 314) and a radially-outer peripheral surface of the peripheral extension 320. As a more specific example, the angle 322 is shown as being a positive acute angle with the angle 322 extending away from the surface 314 and towards the enclosure wall 102 (see FIG. 5) and the plate 304 (i.e., to the right of the surface 314 with respect to the view in FIG. 2), rather than extending away from the surface 314 and away from the enclosure wall and the plate 304 (i.e., to the left of the surface 314 as shown), (which would be a negative angle).

In some cases, a different reference frame can define the angle of the peripheral extension 320. For example, the stud 310 defines an axis 324 and a relevant angle (e.g., corresponding to the angle 322) can be alternatively defined between the peripheral extension 320 and the axis 324. In this case, for example, such an angle would be complementary to the angle 322 and would extend away from the stud 310 and the axis 324 and towards the enclosure wall 102 when installed. In some configurations, the angle 322 is in a range from about 30 degrees to about 80 degrees. In some embodiments, an angle that is complementary to the angle 322 can be in a range from about 10 degrees to about 60 degrees.

In some embodiments, the peripheral extension 320 can extend entirely (or partially) around the axis 324. For example, in the partial configuration, the peripheral extension 320 can have sections (e.g., arc lengths) that do not include the peripheral extension 320. In the entire configuration, the peripheral extension 320 can extend around the entire axis 324. In this way, as described below, the peripheral extension 320 deflects against the enclosure wall 102 around the entire axis 324 to generate a seal between the peripheral extension 320 and the enclosure wall 102 around the entire axis 324. While FIG. 3 shows the peripheral extension 320 as being uniform (e.g., the angle 322 is uniform) throughout the entire circumference of the gasket 212, other configurations are possible (e.g., the angle 322 of the peripheral end varying around the axis 324).

In some embodiments, including as illustrated in FIG. 4, the gasket 312 has an exterior surface 326, an interfacing surface 328, a recess 340, and a cutout 342. The exterior surface 326 and axially extending inner side walls of the gasket 312 define the recess 340, and the exterior surface 326 partially define the cutout 342. Thus, the gasket 312 can receive the plate 308 within the recess 340 to be mechanically secured around the plate 308 and the stud 310. More specifically, the plate 308 is received within the recess 340, such that the exterior surface 326 of the gasket 312 interfaces with the second surface 316 and the outside edge 318 of the plate 308. Similarly, the stud 310 is received through the cutout 342 of the gasket 312. Generally, the elastic nature of the gasket 312 retracts around the plate 308 and the stud 310 to mechanically secure the gasket to the plate 308 and the stud 310. It can be appreciated, however, that the interface between the exterior surface 326 of the gasket 312 and the second surface 316 of the plate 308 can be supplemented, for example, with adhesives to increase the mechanical strength of the interface. Usefully, in some configurations, this arrangement does not require any overmolding operations and easily allows the gasket 312 to be interchanged on the plate 308. Thus, for example, it may be relatively easy for users to substitute new gaskets for older worn gaskets, or utilize gaskets of various different configurations for a particular installation.

In the illustrated embodiment, the surfaces 326, 328 are circular and thus each defines a diameter. However, in other shapes (e.g., square) are possible, depending on the particular application. The difference in diameters between the surfaces 326, 328 defines the difference in diameter 330, which is tied to the angle 322 of the peripheral extension 320.

Although various interfaces are possible, in the illustrated embodiment, the interfacing surface 328 has a sawtooth region 332 situated on a radial end of the gasket 312 (e.g., radial relative to the axis 324). The sawtooth region 332 has triangular cutouts (e.g. saw tooth cutouts) that are directed into the interfacing surface 328, which defines a saw tooth pattern when viewed in cross-section, such as shown in FIG. 4. The cutouts can be uniform in size, can increase in size in an increasing radial direction, can decrease in size in an increasing radial direction, or exhibit other variations (e.g., may be non-triangular) relative to the example illustrated in FIG. 4. While the sawtooth region 332 extends around the entire axis 324 in some cases (e.g., as shown), in alternative configurations, the sawtooth region 332 can extend partially around the axis 324 (e.g., radial arcs of the gasket 312 may not include the sawtooth region 332). In addition, the sawtooth region 332 can be situated at the same location as the peripheral extension 320 (or sections of the peripheral extension 320) (e.g., the sawtooth region 332 being located at the peripheral extension 320). In some embodiments, the regions of the interfacing surface 328 separate from the sawtooth region 332 can be relatively smooth (e.g., relative to a smoothness standard required for hygienic applications). In some cases, the surface 326 can be planar, and the portion of the surface 328 not including the sawtooth region 332 can be planar. In a more specific case, the surface 326 can be coplanar with the portion of the surface 328 that does not include the sawtooth region 332.

Although not illustrated in FIG. 4, the gasket 312 can be visually different than the surrounding enclosure, which can allow for the easy identification of the hygienic hole seal 300 (e.g., for removal purposes). For example, the gasket 312 can be formed of a material that gives the gasket 312 a visually blue appearance, which may be strikingly different than its surrounding environment. Importantly, the gasket 312 is formed out of a hygienic material (e.g., food and beverage grade silicone, medical grade silicone, etc.), some examples of which are naturally visually blue.

In some embodiments, as illustrated in FIG. 4, the first surface 314 of the plate 308 faces towards the external environment. Thus, due to the industrial applicability of the hygienic hole seal 300, at least the first surface 314 can be formed of a hygienic material (e.g., a hygienic grade, or medical grade stainless steel). Similarly, the first surface 314 can be relatively smooth, for example, being within a tolerance of smoothness required for hygienic applications (e.g., to prevent the adherence of pathogens to the first surface 314). For example, the first surface 314 can be planar, and can be coplanar with the surface 326, and with the surface 328 (not including the sawtooth region 332). In some cases, the surface 314 can be flush with an end of the peripheral extension 320 that is more towards the plate 308. In other words, this edge of the peripheral extension 320 does not extend beyond the surface 314. In this way, the transition between the surface 314 of the plate 308 and the gasket 312 at the edge of the peripheral extension 320 can be smooth so that no gaps or protrusions (of the gasket 312) exists that may harbor the growth of microbes.

Similarly to the embodiment of FIG. 2, in the embodiment illustrated in FIG. 4, the retaining member 304 is disposed between the fastener 306 and the sealing member 302. In order to achieve this positional relationship between these components, the retaining member 304 can have a hole 335 sized, such that the stud 310 extends through the hole 335 once a clearance between the retaining member 304 and the plate 308 is small enough. The hole 335 is shown and described as being circular, however, in some embodiments, a hole can be shaped differently (e.g., squarely, triangularly, etc.). Similarly, the retaining member 304 is shown as being circular and plate-like, however, in some embodiments a retaining member can be otherwise (e.g., squarely) shaped, or can include any mechanical component typically used in the art that is configured to engage with the interior surface of the enclosure (e.g., the interior surface 104).

In some embodiments, the retaining member 304 includes beveled, chamfered, or rounded edges, such as a chamfered edge 337 that can extend entirely (or partially) around the perimeter of the retaining member 304. The chamfered edge 337 can face towards the interior surface 104 of the enclosure wall 102 (e.g., during an installed configuration). Thus, for example, if the diameter of the retaining member 304 is sized similarly to the diameter 110 of the aperture 108 (see, e.g. FIG. 5), then the beveled, chamfered, or rounded edges 337 can wedge into the edges that define the aperture 108.

In some configurations, the retaining member 304 has a diameter that is larger than the exterior surface 326 of the gasket 312, and, in some cases, larger than the diameter of the interfacing surface 328 of the gasket 312. This dimensional relationship can allow for the effective distribution of forces necessary to generate a seal with the gasket 312, which will be discussed in more detail below. In some embodiments, the fastener 306 is threaded to threadingly engage the stud 310. As the fastener 306 is rotated, the fastener 306 traverses the stud 310 to urge the retaining member 304 closer to the sealing member 302. Although the retaining member 304 is urged closer to the sealing member 304 by usage of a threaded fastener (e.g., the fastener 306), it can be appreciated that in alternative embodiments, alternative fastening components typically used in the art can be added or substituted.

Figure 5:
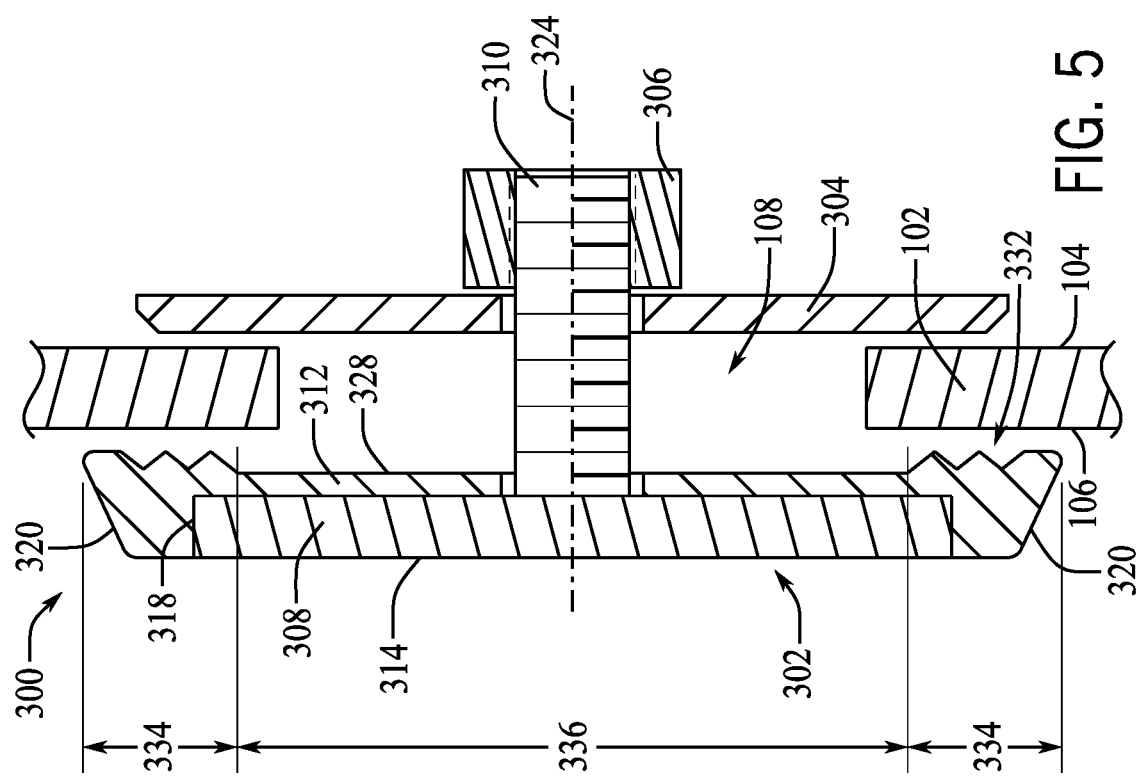
FIG. 5 is a cross-sectional view of the hygienic hole seal of FIG. 4 installed at the aperture of the enclosure of FIG. 1.

FIG. 5 shows the hygienic hole seal 300 in an installed configuration, engaged with the enclosure 100 at the aperture 108. The hygienic hole seal 300 can be installed in numerous ways. However, an example installation process begins with the hygienic hole seal 300 in the configuration shown in FIG. 4. The fastener 306 is rotated and removed from engagement with the stud 310 of the sealing member 302. Then, the retaining member 304 is also removed from the stud 310. Once the fastener 306 and the retaining member 304 have been removed, the sealing member 302 is placed in the desired position. More specifically, the gasket 312 is situated against the exterior surface 106 of the enclosure wall 102, and correspondingly the stud 310 is inserted through the aperture 108. Then, with the stud 310 through the aperture 108, the stud 310 is inserted into the hole 335 of the retaining member 304.

Subsequently, the fastener 306 is threadingly engaged with the stud 310 and is then rotated to urge the retaining member 304 against the interior surface 104 of the enclosure wall 102. As the retaining member 304 is urged against the interior surface 104 by tightening the fastener 306, the gasket 312 is correspondingly urged against the exterior surface 106, and the peripheral extension 320 of the gasket 312 deflects away from the stud 310 to generate an appropriate seal. In some cases, the sawtooth region 332 allows the peripheral extension 320 to either deflect more easily, or to a greater extent than the edge 320 might otherwise (e.g., to deflect at a greater angle), or can otherwise help to ensure that an appropriate seal is obtained.

In some embodiments, and as illustrated in FIG. 5, the gasket 312 extends fully across the aperture 108 when the gasket 312 is in sealing engagement with the exterior surface 106 of the enclosure wall 102 (e.g., and with the gasket 312 being positioned outside of the aperture 108 of the enclosure wall 102). This sealing engagement thus allows for the hygienic hole seal 300 to be used to generate a seal for various sized (and shaped) apertures in enclosure walls. For example, the hygienic hole seal 300, and more specifically the gasket 312, the plate 308, the retaining member 304, or any combinations of these, can be dimensioned such that the hygienic hole seal 300 can generate a seal for various sized apertures.

In some embodiments, such as in the illustrated installed configuration of the hygienic hole seal 300, contact between the gasket 312 and the enclosure wall 102 (e.g., the exterior surface 106) can define a sealing area 334, and a non-sealing area 336 that is positioned radially inward relative to the sealing area 334. In some cases, the sealing area 334 can be the only portion of the gasket 312 that is compressed. For example, the sealing area 334 can include only the contact between the peripheral extension 320 of the gasket 312 and the enclosure wall 102. In some cases, the sealing area 334 can include a portion (or the entire) saw tooth region 334. The remaining portion of the surface of the gasket 312 that faces the enclosure wall 102 that is not the sealing area 334 can define the non-sealing area 336. In some embodiments, advantageously the sealing area 334 can be smaller than the non-sealing area 336. In this way, more of the clamping force from the fastener 306 is directed to creating a tighter seal at the sealing area 334 rather than a looser seal that includes all regions of the gasket 312. In some cases, the non-sealing area 336 can include portions of the gasket 312 that have not been compressed. In some embodiments, the sealing area 334 can form a continuous perimeter around the aperture 108 of the enclosure wall 102. The shape of this continuous perimeter can depend on the shape of the gasket 312. For example, such as when the gasket 312 is implemented as a circle, the sealing area 334 can have an annulus shape and the perimeter can have a circular shape.

Figure 6:
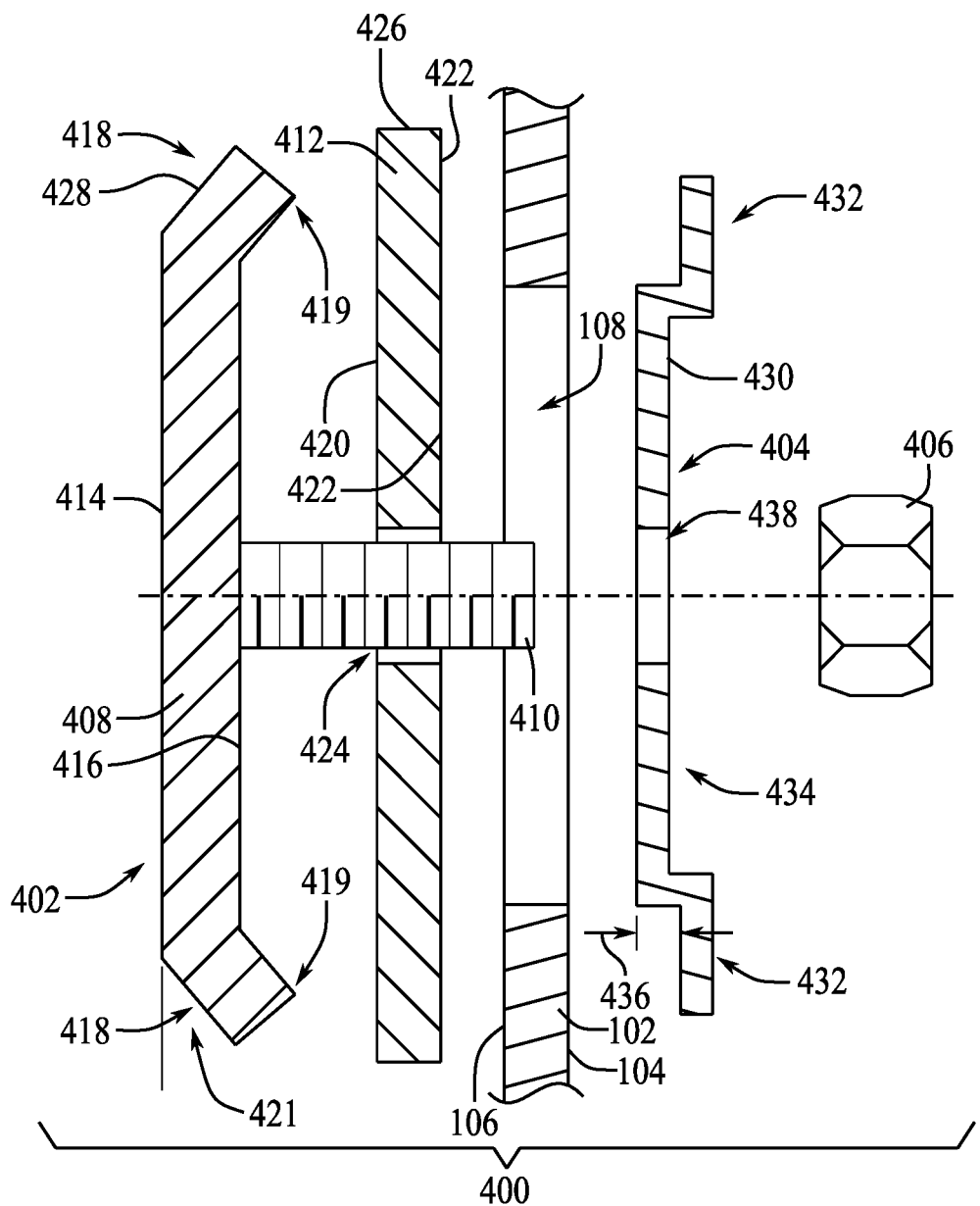
FIG. 6 is a cross-sectional, exploded view of another hygienic hole seal.

FIG. 6 shows a hygienic hole seal 400 according to yet another embodiment of the invention, in an exploded, cross-sectional view relative to the enclosure wall 102. The hygienic hole seal 400 includes components similar to the previously described hygienic hole seals (e.g., the hygienic hole seals 200, 300), and thus some description of the previously described hygienic hole seals also pertains to the hygienic hole seal 400. For example, the hole seal 400 also includes a sealing member 402, a retaining member 404, and a fastener 406. As shown, the sealing member 402 includes a plate 408 and a stud 410 coupled to the plate 408. The plate 408 has a first surface 414, an opposite second surface 416, and a peripheral extension 418. As shown in FIG. 6, the first surface 414 is planar, however in alternative configurations, the first surface 414 can have other three dimensional shapes. For example, the first surface 414 can be curved.

In contrast to the edges 218, 318 of the plates 208, 308, however, the peripheral extension 418 is angled away from the first surface 414. For example, the first surface 414 can be planar and a reference plane can be aligned with the first surface 414 and can extend beyond the perimeter of the first surface 414. As shown in FIG. 6, peripheral extension 418 can be angled at an acute angle 421 defined between the reference plane (as defined by the surface 414) and a peripheral surface 428 of the peripheral extension 418 (e.g., a radially peripheral surface, as shown). As a more specific example, this angle is shown in FIG. 6 as being a positive acute angle with the angle 421 extending away from the surface 414 and towards the enclosure wall 102 (see FIG. 6) and the plate 430 (i.e., to the right of the surface 414 with respect to the view in FIG. 6), rather than extending away from the surface 414 and away from the enclosure wall 102 and the retaining member 404 (i.e., towards the left of the surface 414 with respect to the view in FIG. 6), which would be a negative angle.

In some cases, a different reference frame can define the angle 421 of the peripheral extension 418. For example, the stud 410 defines an axis extending along the length of the stud 410, and the angle 421 of the peripheral extension 418 can be defined between the peripheral extension 418 and a reference line parallel to this axis. In this case, for example, such an angle would be complementary to the angle 421 and would extend away from the stud 410 and towards the enclosure wall 102 when installed. In some configurations, the angle 421 can be in a range from about (i.e., deviating by less than 10 percent) 30 degrees to about 80 degrees. In some embodiments, an angle that is complementary to the angle 421 can be in a range from about 10 degrees to about 60 degrees. Although not shown, the peripheral extension 418 can be angled away from the first surface 414 around the entire circumference (or perimeter in the case of other plates having other shapes than being circular) of the plate 408. However, in alternative embodiments, the peripheral extension 418 can be angled along only some portions of the circumference (or perimeter) of the plate 408.

Similarly to the hygienic hole seals 200, 300, the stud 410 of the hygienic hole seal 400 is threaded and is configured to threadingly engage with the fastener 406 (e.g., a nut, as illustrated in FIG. 6). In some embodiments, the threading of the stud 410 can span the entirety or only some portions of the axial length of the stud 410.

The sealing member 402 also includes a gasket 412 that is circular, although in other configurations other shapes are possible (e.g., when the plate 408 also has a different shape). The gasket 412 has a first surface 420, an opposite second surface 422, and a hole 424 directed through the gasket 412. As with the gaskets 212, 312, for example, the gasket 412 can be formed from a variety of materials, including hygienic materials in some cases (e.g., food and beverage grade silicone, medical grade silicone, etc.)

In some embodiments, and as illustrated, the retaining member 404 is implemented as a plate 430 having a peripheral end 432 that is rearwardly offset from a central region 434 of the plate 430 by a distance 436 that extends in a direction away from the enclosure wall 102 in an installed configuration of the hole seal 400. In other words, the plate 430 is shaped so as to have the central region 434 extend a greater distance (e.g., prior to installation) than the peripheral flange 432 along an axial axis (e.g., that extends through the aperture 108). The peripheral end 432 is implemented as being a shelf that extends substantially perpendicular to a surface of the central region 434 (and to the interior surface 104 of the enclosure 100). The diameter of the central region 434 corresponds in size to the diameter of the aperture 108 of the enclosure wall 102. In this way, when installed, the central region 434 can be inserted into the aperture 108 of the enclosure wall 102, and a surface of the peripheral end 432 can contact the interior surface 104 of the enclosure wall 102. In alternative configurations, the plate 430, and the aperture 108 can embody different shapes. In the illustrated embodiments of FIG. 6, the plate 430 also includes a hole 438 directed through the plate 430, located within the central region 434, as can receive the stud 410.

In some embodiments, and as illustrated in FIG. 6, the hygienic hole seal 400 can be installed to be in sealing engagement with the exterior surface 106 of the enclosure wall 102. For example, the gasket 412 can be positioned such that the stud 410 is inserted through the hole 424 of the gasket 412. The stud 410, with the gasket positioned accordingly, can be inserted into the aperture 108 of the enclosure 100. Then, a portion of the stud 410 can be inserted through the hole 438 of the plate 430 (or otherwise retaining member 404), and the fastener 406 then be threadingly engaged with the stud 410. Once the hygienic hole seal 400 is appropriately aligned with the aperture 108 of the enclosure wall 102, the fastener 406 can be further tightened (e.g., rotated) to urge the plate 408 and the gasket 412 towards the exterior surface 106 of the enclosure wall 102, and to correspondingly urge the plate 430 to seat within the aperture 108 (e.g., the central region 434), and to contact the interior surface 104 of the enclosure wall 102. By tightening the fastener 406, the peripheral end 419 of the plate 408 is urged against the gasket 412 to cause the gasket 412 to contact (and in some cases deflect towards) the exterior surface 106 of the enclosure wall 102 to generate an appropriate seal (e.g., with the gasket 412 outside of the aperture 108 of the enclosure wall 102).

Although not illustrated, when the hygienic hole seal 400 is in an installed configuration about the aperture 108 of the enclosure wall 102, the gasket 412 extends fully (or otherwise entirely) across the aperture 108, in sealing engagement with the exterior surface 106 of the enclosure wall 102.

Figure 7:
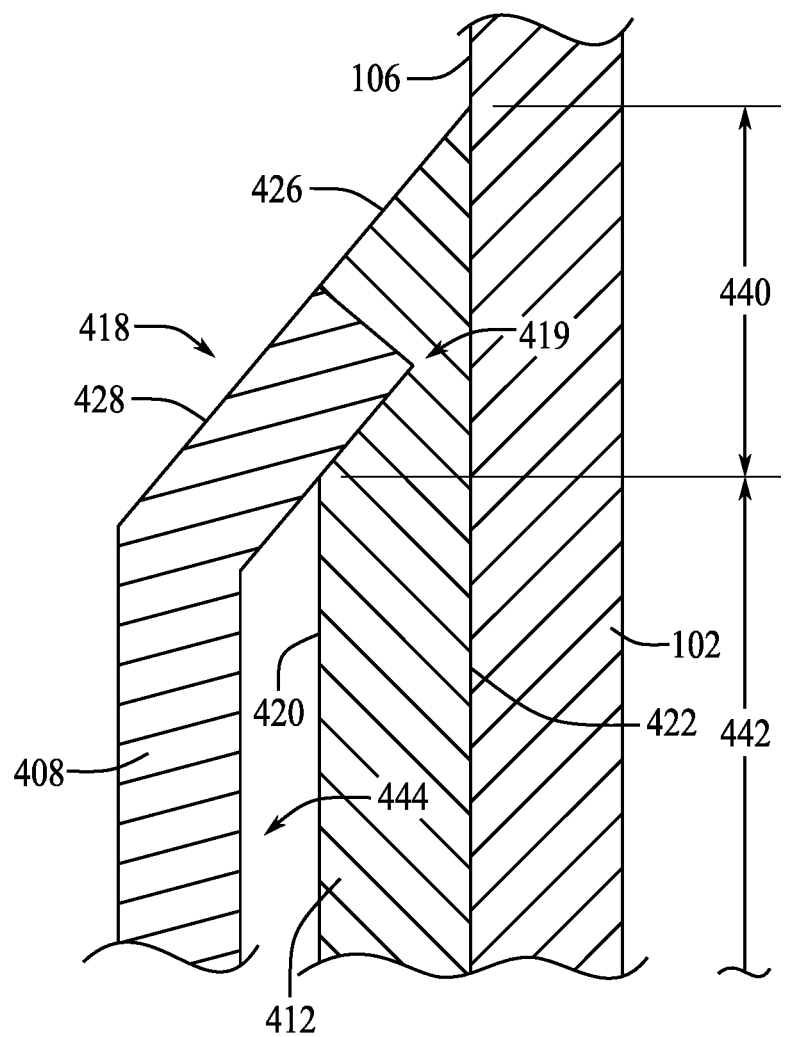
FIG. 7 is an enlarged cross-sectional view of the hygienic hole seal of FIG. 6 in sealing engagement with the aperture of the enclosure wall.

FIG. 7 shows an enlarged cross-sectional view of the hygienic hole seal 400 in sealing engagement with the aperture 108 of the enclosure wall 102. As shown, the peripheral end 419 of the plate 408 is depressed into the first surface 420 of the gasket 412, when the plate 408 is urged towards the exterior surface 106 of the enclosure wall 102 (e.g., by tightening the fastener 406). Thus, the non-rounded end 419 at the peripheral extension 418 of the plate 408 displaces the material of the gasket 412 during installation. With an appropriate combination of tightening force, resiliency of the material of the gasket 412, and geometry of the peripheral extension 418, this displacement can result in an transition between the enclosure wall 102 and the hole seal 400, around a perimeter of the gasket 412 that creates a transition, that is generally void of niches that can collect debris. The displacement of the gasket 412 can also create a particularly high-pressure perimeter seal between the edge of the hole seal 400 and the enclosure wall 102.

In some embodiments, for example, when the hygienic hole seal 400 is installed at an aperture 108 of the enclosure 100, a peripheral surface 426 of the gasket 412 (e.g., that is at the farthest radial end of the gasket 412) can align with the peripheral surface 428 of the peripheral extension 418 of the plate 408. In other words, the peripheral surface 426 of the gasket 412 can be angled relative to the stud 410 at the same angle as the peripheral extension 418 is angled relative to the stud 410 (e.g., at an interface between the surfaces 426, 428, or over a more extended distance). In this way, the peripheral surface 426 of the gasket 412 can be flush with the peripheral surface 428 of the plate 408 so that when water (or other chemical solutions) are sprayed on the hygienic hole seal 400, all of the exterior surface of the gasket 412 is exposed to the water to dislodge microorganisms. In addition, the flush alignment of the components can prevent the formation of gaps, ledges, etc., that may harbor microorganisms.

In some cases, although the peripheral surface 426 of the gasket 412 is illustrated as being parallel relative to the axial direction of the stud 410 in an uncompressed configuration (e.g., when not installed with the enclosure wall 102), in alternative configurations, the gasket 412 can be formed (e.g., cut) so that the peripheral surface 426 is angled relative to the stud 410 in the same direction as the angle of the peripheral extension 418 (e.g., the positive direction) For example, a peripheral edge can be formed on the gasket 412 so that the peripheral surface 426 is angled relative to the first surface 414 in a similar manner to the peripheral extension 418 (e.g., prior to fastening the fastener 406).

In some cases, the gasket 412 can have a frustoconical shape. In this case, for example, a first surface of the gasket 412 closer to the plate 408 can have a larger cross-section than the opposing surface of the gasket 412 that is farther from the plate 408. In some cases, the peripheral surface 426 can be angled in the same direction relative to the surface 414 as the peripheral extension 418 (e.g., both being in the positive direction). In some cases, the angle of the peripheral surface 426 of the gasket 412 relative to the surface 414 can be smaller than the angle of the peripheral end 418 relative to the surface 414, when the gasket 412 is in an uncompressed state (e.g., when not installed with the enclosure wall 102). In this way, when the peripheral end 419 contacts the gasket 412, and the fastener 406 is further tightened, the gasket 412 can radially expanded (i.e., away from the axis defined by the length of the stud 410), which can decrease the angle of the peripheral surface 426 of the gasket 412 relative to the stud 410 and the surface 414 (e.g., to match the angle of the peripheral surface 428 of the peripheral end 418 relative to the stud 410 and the surface 414). In this way, the uncompressed angle of the peripheral surface 426 of the gasket 412 can accommodate for the radial expansion of the gasket 412 during compression. For example, in the installed configuration of the hygienic hole seal 400, with the radial expansion of the gasket 412, the surfaces 426, 428 are advantageously coplanar. In some cases, and regardless of the configuration of the gasket 412 (e.g., the shape of the peripheral surface 426), the angle of the peripheral surface 426 of the gasket 412 relative to the surface 414 can change (e.g., increase) after installation and compression of the gasket 412. For example, the angle of the peripheral surface 426 of the gasket 412 can approach the angle 421. In particular, the angle of the peripheral surface 426 of the gasket 412 can substantially (or entirely) align with the peripheral surface 428 of the plate 408 (e.g., when the fastener 406 is tightened and the gasket 412 is compressed). In this way, ledges, crevices, etc., between the gasket 412 and the plate 408 are reduced, which may harbor microbes. In some configurations, the peripheral surface 426 of the gasket that is angled can extend entirely (or partially) around the perimeter or circumference of the gasket 412.

In some cases, and as shown in FIG. 7, the peripheral end 419 of the peripheral end 418 of the plate 408 is not rounded. In other words, the peripheral end 419 of the peripheral end 418 of the plate 408 can sometimes include an apex. In some cases, as the fastener is fastened 406, the apex can better grip the surface 420 of the gasket 412 to ensure that the peripheral end 418 of the plate 408 does not simply slide across the surface 420 of the gasket 412, but rather firmly forces the surface 422 into engagement with the exterior surface 106 of the enclosure wall 102.

In some embodiments, such as in the installed configuration of the hygienic hole seal 400, contact between the gasket 412 and the enclosure wall 102 (e.g., the exterior surface 106) can define a sealing area 440, and a non-sealing area 442 that is positioned radially inward relative to the sealing area 440. In some cases, the sealing area 440 can be the only portion of the gasket 412 that is compressed. For example, the sealing area 440 can include only the portion of the gasket 412 that is in contact with the peripheral extension 418 of the plate 408 and the enclosure wall 102. The remaining portion of the surface of the gasket 412 that faces the enclosure wall 102 that is not the sealing area 440 can define the non-sealing area 442. In some embodiments, advantageously the sealing area 440 can be smaller than the non-sealing area 442.

In this way, more of the clamping force from the fastener 406 is directed to creating a tighter seal at the sealing area 440 rather than a looser seal that includes all regions of the gasket 412. In some cases, the non-sealing area 442 can include portions of the gasket 412 that have not been compressed. In some embodiments, the sealing area 440 can form a continuous perimeter around the aperture 108 of the enclosure wall 102. The shape of this continuous perimeter can depend on the shape of the gasket 412. For example, such as when the gasket 412 is implemented as a circle, the sealing area 440 can have an annulus shape and the perimeter can have a circular shape.

In some embodiments, and as shown in FIG. 7, in the installed configuration, a gap 444 occurs between the surface of the gasket 412 that faces away from the enclosure wall 102 and the plate 408. In some cases, this gap 444 can align partially or entirely with the non-sealing area 442 of the gasket 412.

For uses of hole seals in food and beverage production facilities, or other hygienic applications, reducing areas that can collect debris can be important for removing areas in which bacteria can be harbored. The smooth transition also allows for cleaning operations to successfully remove debris and have cleaning compounds be rinsed away. This can be particularly important, for example, to allow the types of high-pressure washing that are employed in some contexts.

In some cases, the configuration illustrated in FIGS. 6 and 7 can also result in beneficial deformation of the gasket 412 relative to the plate 408. For example, as shown in FIG. 7 and also discussed above, the compression of the angled peripheral end 419 into the gasket 412 can deform the gasket 412 so that the outer peripheral boundary of the plate 408 is flush with the gasket 412 and the outer angled surface of the peripheral extension 418 transitions smoothly (e.g., tangentially, and without a substantial crevice) onto the angled peripheral boundary of the gasket 412. In other embodiments, however, other amounts of compression and deformation can be optimally obtained.

Although some of the discussion above is framed in particular around systems, such as the hygienic hole seals 200, 300, and 400, those of skill in the art will recognize therein an inherent disclosure of corresponding methods of use of the disclosed systems. Correspondingly, some embodiments of the disclosure can include methods of using (e.g., installing or removing) a hygienic hole seal to provide, utilize, or remove a sealing engagement with an aperture of an enclosure, including methods of installing or otherwise using the hole seals 200, 300, 400.

Thus, embodiments of the inventions can provide an improved hole seals, including for hygienic applications. For example, the hygienic hole seal systems and methods, according to some embodiments of the present disclosure, can accommodate a wide range of apertures sizes for a given size of seal and can provide improved resistance to ingress of dust, water, and other contaminants, including during high-pressure cleaning operations.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:
1. A hole seal comprising:
a plate having a surface configured to face away from an enclosure wall of an enclosure, and a peripheral extension that is angled away from the surface;
a stud coupled to and extending away from the plate;
a gasket with a peripheral surface;
a retaining member configured to engage the enclosure wall of the enclosure opposite the gasket; and
a fastener configured to threadingly engage the stud and be advanced along the stud to urge the retaining member against the enclosure wall, thereby urging the peripheral extension of the plate into the gasket, via compression of the gasket against an exterior surface of the enclosure wall;
wherein the peripheral extension of the plate is configured to change an angle of the peripheral surface of the gasket, relative to the stud, via the compression of the gasket against the enclosure wall, so that the peripheral surface of the gasket is substantially aligned with a peripheral surface of the peripheral extension of the plate at a transition between the gasket and the plate.

2. The hole seal of claim 1, wherein the peripheral extension of the plate includes a peripheral edge, and
wherein as the fastener is advanced, the peripheral edge of the plate is configured to contact the gasket first.

3. The hole seal of claim 1, wherein the gasket has a first hole, the retaining member has a second hole, and
wherein the stud is configured to extend through the first hole of the gasket, extend through an aperture of the enclosure wall, and extend through the second hole of the retaining member to threadingly engage with the fastener, and
wherein the gasket has opposing planar surfaces, and the surface of the plate is planar.

4. The hole seal of claim 1, wherein the peripheral extension of the plate is configured to angle away from the stud and towards the enclosure wall when the hole seal is installed with the enclosure wall.

5. The hole seal of claim 1, wherein a central region of the retaining member is configured to be inserted into an aperture of the enclosure wall and contact a peripheral surface of the enclosure wall that defines the aperture of the enclosure wall.

6. The hole seal of claim 1, wherein the gasket is configured to extend entirely across an aperture of the enclosure wall to be sealed by the gasket, when the hole seal is installed with the enclosure.

7. The hole seal of claim 6, wherein, when the hole seal is installed with the enclosure, the gasket is configured to define a sealing area between the gasket and the enclosure wall, and a non-sealing area between the gasket and the enclosure wall, the non-sealing area being positioned radially inward relative to the sealing area.

8. The hole seal of claim 7, the sealing area is aligned with a region of the gasket in contact with the peripheral extension of the plate, and
wherein the sealing area has an annulus shape.

9. The hole seal of claim 8, wherein the plate and the gasket are configured to maintain a gap between the plate and the gasket, when the hole seal is installed with the enclosure, the gap extending along the non-sealing area.

10. A hole seal comprising:
a plate;
a stud coupled to and extending away from the plate and defining an axial direction;
a gasket that surrounds the stud;
a retaining member configured to engage an enclosure wall of an enclosure opposite the gasket; and
a fastener configured to threadingly engage the stud,
the plate having a peripheral extension that is angled away from the stud and is configured to angle towards the enclosure wall when installed on the enclosure wall, the peripheral extension of the plate being configured to first contact the gasket and compress the gasket against an exterior surface of the enclosure wall as the fastener is tightened onto the stud, wherein, from a perspective moving only in the axial direction, a gap in the axial direction is maintained between the plate and the gasket, radially inwardly from the peripheral extension.

11. The hole seal of claim 10, wherein when the hole seal is installed with the enclosure, the gasket defines a sealing area between the gasket and the enclosure wall along the peripheral extension of the plate, and a non-sealing area between the gasket and the enclosure wall along the gap.

12. The hole seal of claim 10,
wherein the plate is configured to first contact the gasket at a peripheral end of the peripheral extension of the plate, when the fastener is tightened, to compress the gasket against the exterior surface of the enclosure wall.

13. The hole seal of claim 12, wherein the gasket has a first hole, the retaining member has a second hole, and the retaining member has a central region and a peripheral end that is rearwardly offset from the central region in a direction that extends away from the enclosure wall when the retaining member is installed,
wherein the stud is configured to extend through the first hole of the gasket, extend through an aperture of the enclosure wall to be sealed by the gasket, and extend through the second hole of the retaining member prior to be threadingly engaged with the fastener, and
wherein the central region of the retaining member is configured to be forced into the aperture of the enclosure wall, when the fastener is tightened, so that the peripheral end contacts an interior surface of the enclosure wall.

14. The hole seal of claim 12, wherein a peripheral surface of the gasket is configured to substantially align with a peripheral surface of the peripheral extension of the plate, after the fastener is tightened to compress the gasket.

15. A method for sealing an aperture of an enclosure with a hole seal, the method comprising:
engaging a threaded fastener with a stud of the hole seal that is connected to a plate of the hole seal; and
rotating the threaded fastener until the threaded fastener urges a retaining member of the hole seal into contact with an interior surface of an enclosure wall of the enclosure;
wherein urging the retaining member into contact with the interior surface of the enclosure urges the plate toward the enclosure to cause a peripheral extension of the plate to compress a gasket of the hole seal against an exterior surface of the enclosure wall, the peripheral extension of the plate being angled towards the exterior surface of the enclosure wall, relative to the plate, so that the compression of the gasket by the peripheral extension of the plate displaces material of the gasket to move a peripheral surface of the gasket to be parallel with the peripheral extension of the plate at a transition between the gasket and the plate.

16. The method of claim 15, wherein contact between the peripheral extension of the plate and the gasket to compress the gasket:
generates a sealing area between the gasket and the enclosure wall, the sealing area including a portion of the gasket in contact with the peripheral extension of the plate; and
generates a non-sealing area between the gasket and the enclosure wall that is radially inward from the sealing area.

17. The method of claim 15, wherein the peripheral extension of the plate contacts a first surface of the gasket that faces the plate to compress the gasket against the enclosure wall; and wherein contact between the peripheral extension of the plate and the first surface of the gasket changes an angle of the peripheral surface of the gasket, relative to the plate, to substantially align the angle of the peripheral surface of the gasket with an exterior surface of the peripheral extension of the plate.

18. The method of claim 15, wherein the retaining member includes a central region and a peripheral flange that is rearwardly offset from the central region, and further comprising:

inserting the central region into the aperture of the enclosure wall; and contacting the peripheral flange of the retaining member with an interior surface of the enclosure wall.

\* \* \* \* \*